United States Patent [19]
Palmer et al.

[11] Patent Number: 5,244,101
[45] Date of Patent: Sep. 14, 1993

[54] STAINLESS-STEEL BICYCLE PARKING RACK WITH LOCK PROTECTOR

[76] Inventors: John D. Palmer, 776 Victoria St., San Francisco, Calif. 94127; Geoffrey D. Palmer, 1072 Folsom #328, San Francisco, Calif. 94103

[21] Appl. No.: 860,153
[22] Filed: Mar. 30, 1992
[51] Int. Cl.⁵ ............................................. A47F 7/00
[52] U.S. Cl. ................................... 211/5; 211/17; 70/58
[58] Field of Search .................... 211/5, 4, 17; 70/58, 70/62, 233, 237

[56] References Cited

U.S. PATENT DOCUMENTS

| | | | |
|---|---|---|---|
| 3,739,609 | 6/1973 | Kaufmann | 211/5 X |
| 3,783,659 | 6/1972 | Rossi . | |
| 3,970,197 | 1/1990 | Jay . | |
| 4,316,544 | 2/1982 | Goldstein | 211/5 |
| 5,025,932 | 6/1991 | Jay | 211/5 X |

Primary Examiner—Robert W. Gibson, Jr.
Attorney, Agent, or Firm—Flehr, Hohbach, Test, Albritton & Herbert

[57] ABSTRACT

A bicycle parking rack that encloses and secures a bicycle left crankarm (40) within a chamber (12), prevents its removal from the bicycle and provides for multiple locking mechanisms within protective, stainless-steel plating. The baseplate (10) is affixed to a permanent vertical or horizontal surface by welding or non-removable fasteners. The chamber rises to a height just above the bicycle bottom bracket shell (52). A door (16) on the chamber allows entry of the crankarm. A padlock, cylinder lock, or both, are placed inside the chamber. They lock an upper hasp plate (34a), welded to the chamber, to a lower hasp plate (34b), welded to the door. A U-lock is used by inserting it through the left side of door and chamber. The upper U-lock shackle leg (46a) is inserted through the U-lock upper door hole (28a) and U-lock upper chamber hole (28b). The lower U-lock shackle leg (46b) is inserted through the U-lock lower chamber hole (30a) and U-lock lower baffle hole (30b). A bicycle cable is utilized to secure the bicycle's wheels by placing the cable ends over a cable end hitch (32) before locking the door.

23 Claims, 3 Drawing Sheets

STAINLESS-STEEL BICYCLE PARKING RACK WITH LOCK PROTECTOR

BACKGROUND—FIELD OF INVENTION

This invention relates to bicycle parking /locking facilities, specifically to a unique design of capturing the bicycle's crankarm while at the same time greatly enhancing the effectiveness of portable locks.

BACKGROUND—DESCRIPTION OF PRIOR ART

Bicycle use is hampered primarily by the lack of a secure method to park and lock a bicycle once a destination has been reached. Today's bike thief employs a number of ways to easily defeat bicycle racks and locks. Generations of portable locks have been developed intending to affix the bicycle either to a seemingly rigid post or to various metal rod/bar parking facilities. In either situation, whether locked to a post or parking rack, bicycle theft is still rampant for two main reasons.

One, the professional thief, equipped with portable power drills, saws, hammers, chisels, crowbars, hydraulic or mechanical jacks, and liquid nitrogen is prepared to break any exposed bicycle locks within minutes. And two, when the bicycle is attached to a bicycle parking rack, the thief sees that in many instances it is faster to obtain it by disabling the parking rack, by-passing the lock entirely.

The most advanced and popular of the metal rod/bar rack structures has been U.S. Pat. No. 3,783,659X to Rossi (1972). It is currently marketed as "RACK III" and is based on a hinged, 3-shaft capturing method. Unfortunately, it too can be easily defeated by either an assault on the rack itself or the user's lock.

Disabling the rack is accomplished by sawing, torching, or jacking one piece of already bentstressed 1.9 cm by 0.95 cm metal bar which acts as the center locking shaft. The rack then opens apart releasing its hold on the bike. Any design based on open-architecture metal bars or rods invites this type of tampering on its weakest point. Furthermore, a thief has the option of taking the entire rack plus bicycle since the expansion bolt heads that fasten the RACK III to the ground are not guarded against criminal destruction.

As for exposure of the lock, RACK III has made an attempt to shield only a pad or combination lock by providing a cylindrical, perforated sheet metal canister around the locking point. However, a thief with his bag of tools can quickly see there is ample access to dismember the lock any number of ways. RACK III does advocate the use of U-locks to clamp the rack together, but provides no shielding for them. Since the U-locks are used in a fully exposed manner they are still vulnerable to being pried apart by either a pipe wrench or auto jack. Also, the newer, shorter U-locks designed to allow less room for manipulation simply do not fit around the RACK III. A further design limitation of the RACK III is that it depends on having clear passage for all three shafts that must pass through the bicycle frame and tires. If a user has a non-conventional bicycle design such as an elevated chain-stay, or has accessories attached where a shaft must clear, the RACK III becomes very frustrating to use.

The RACK III is significant in this essay for two reasons. One, it employs moving parts to seriously capture the frame of a bicycle. And two, it does provide a protective minimal housing around one means of locking. An invention that comes closer to ours in its concept of capturing a bicycle but farther from its intended use in U.S. Pat. No. 3,970,197 to inventor Jay (1990).

Jay's invention is an auto bicycle rack for vehicles equipped with a frame-mounted trailer hitch. It is not intended to serve as a fixed site bicycle parking rack. The similarity is that it attaches to a bicycle's left crankarm. It has a slotted hollow shaft with cutouts for a crankarm to slip down into. Then using an unprotected lock, a separate cap is locked on top of the shaft to restrain the bike. If this device were ever built and used it would subject the crankarm and bearings to nearly constant lateral forces from stop and go driving in a direction that these components were not designed to withstand. As it is presently designed it could not serve as a permanent bicycle parking rack for the following reasons:

(a) There are no provisions to protect the lock. A swift blow by a sledge hammer or leverage of an iron bar would quickly take a key or combination lock off;

(b) It would not to accommodate other types of locks such as U-locks or cylinder locks;

(c) Multiple locks have been cited as a major deterrent to theft. This device is designed to only accept one at a time.

OBJECTS AND ADVANTAGES

Our rack solves the flaws of both the RACK III and Jay's vehicle rack while adding several new features. It is not a slight variation of either product but rather a completely new design for a superior bicycle parking facility embodying these advantages:

(a) It does not expose metal rods or bars which can be easily broken to steal the bicycle;

(b) It is designed to protect locks from tampering or destruction by locating the cylinder/tumbler mechanisms and key insertion access deep within a central chamber;

(c) It is the only bicycle parking rack that uses up three different types of locks simultaneously, and is the only one to accept cylinder locks which are widely used on car-top bicycle racks;

(d) In the unlikely event that a lock is broken our device is designed in such a way that the remaining parts will still secure the bicycle;

(e) It is designed to accommodate the widest range of bicycle sizes having both conventional and new frame geometries;

(f) It takes only thirty percent the space of other bicycle parking racks and considerably less metal;

(g) It is constructed of stainless-steel that retards flame-cutting, requires no maintenance, and is installed permanently by welding it to stainless-steel fasteners;

(h) Its compact size and mode of operation allow for greater installation possibilities—odd-shaped, restricted, or uneven ground sites, as well as vertical placement on walls, posts or railings;

(i) The location of our rack's mounting attachments preclude removal of the bicycle and parking rack together.

Additional objects and advantages are to provide, in its superior design, a parking rack that reduces substantially the chance of theft, is easier to use, and mixes better aesthetically with surroundings. Other objects and advantages are noted in the ensuing description and drawings.

DRAWING FIGURES

In the drawings, closely related parts have the same number but different alphabetic suffixes.

Figure 1:
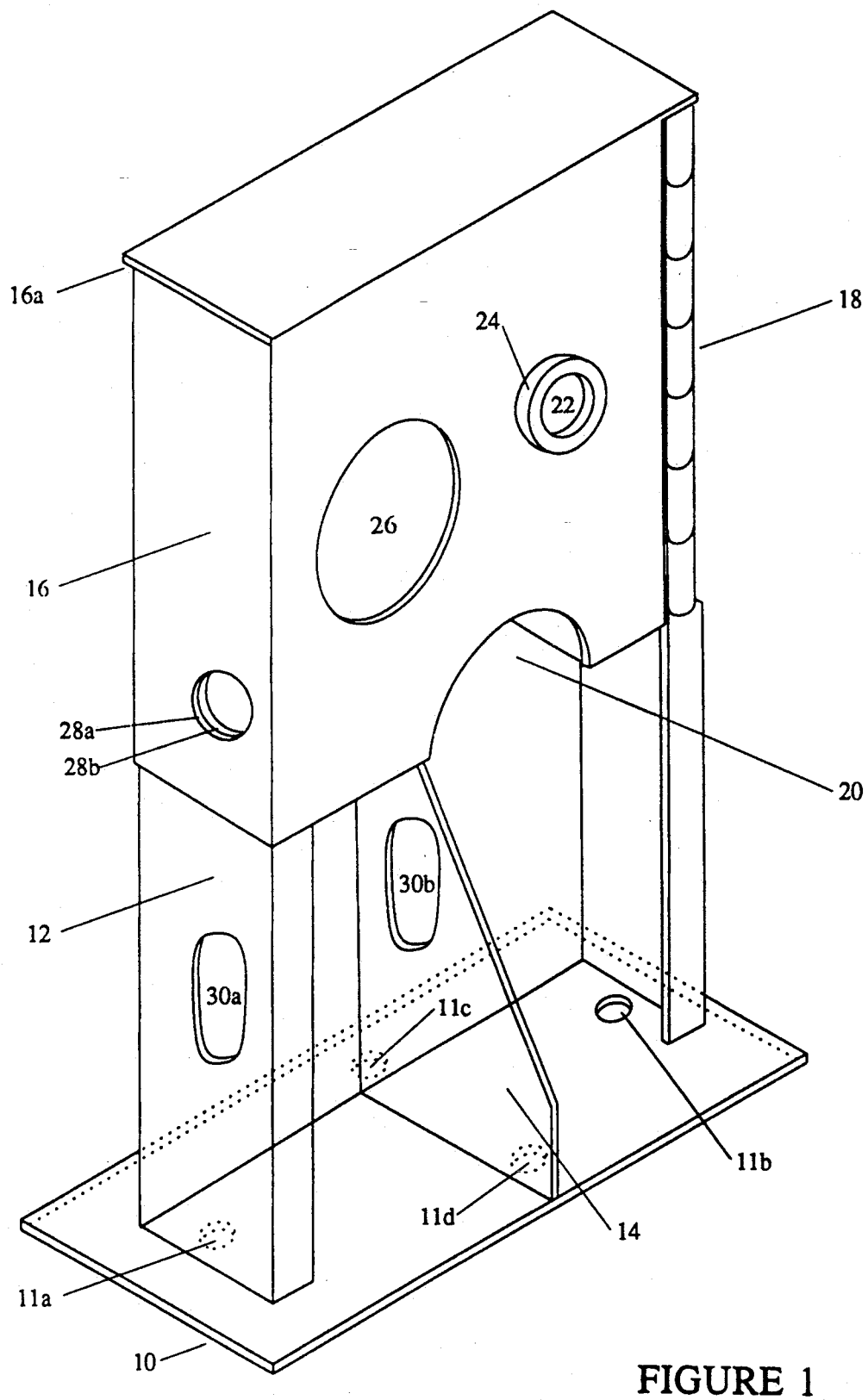
FIG. 1 shows the bicycle parking rack without a bicycle's left crankarm inserted nor any locks installed.

Reference Numerals In Drawings (Introduced in FIG. 1)

| | |
|---|---|
| 10 | Base Plate |
| 11a | Mounting Hole Left |
| 11b | Mounting Hole Right |
| 11c | Mounting Hole Aft |
| 11d | Mounting Hole Front |
| 12 | Chamber |
| 14 | Anti-Drill Baffle |
| 16 | Door |
| 16a | Topside Door Flange |
| 18 | Door Hinge |
| 20 | Key Access Cutout |
| 22 | Cylinder Lock Hole |
| 24 | Cylinder Lock Reinforced Ring |
| 26 | Padlock Rotation/Insertion Access Hole |
| 28a | U-Lock Upper Door Hole |
| 28b | U-Lock Upper Chamber Hole |
| 30a | U-Lock Lower Chamber Hole |
| 30b | U-Lock Lower Baffle Hole |

Figure 2:
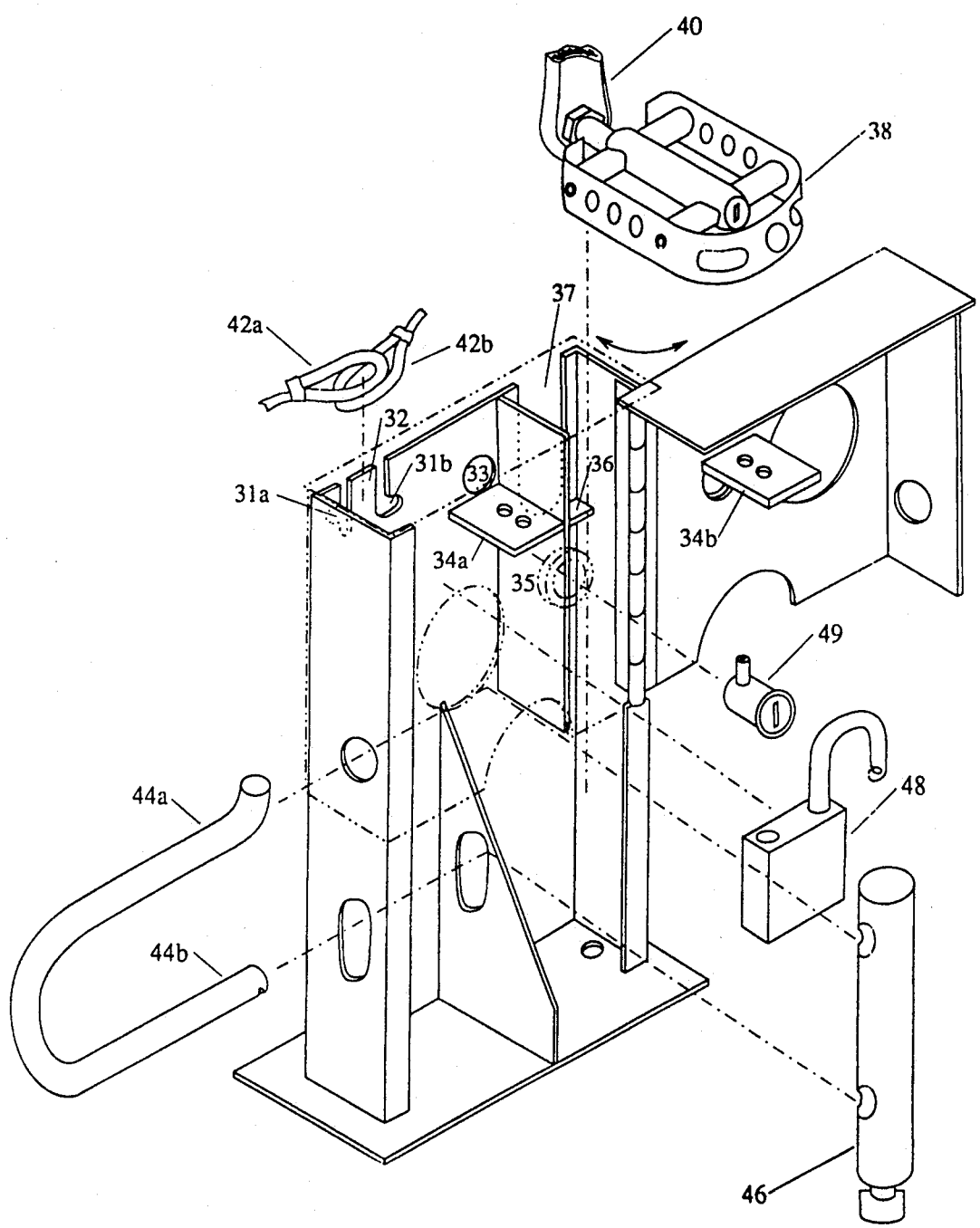
FIG. 2 shows the same view (at a smaller scale) with the device's door open 180 degrees. This figure shows the parts of the inner chamber and shows where locks and crankarm are inserted using an exploded representation.

(Introduced in FIG. 2)

| | |
|---|---|
| 31a | Left Cable End Slot |
| 31b | Right Cable End Slot |
| 32 | Cable End Hitch |
| 33 | Finger Access Hole |
| 34a | Upper Hasp Plate* |
| 34b | Lower Hasp Plate* |
| 35 | Crankarm Positioning Vertical Baffle |
| 36 | Crankarm Positioning Horizontal Baffle |
| 37 | Axle Clearance Slot** |
| 38 | Bicycle Pedal |
| 40 | Bicycle Left Crankarm |
| 42a | Left Cable End |
| 42b | Right Cable End |
| 44a | Upper U-Lock Shackle Leg |
| 44b | Lower U-Lock Shackle Leg |
| 46 | U-Lock Receptacle Barrel |
| 48 | Pad Lock |
| 49 | Cylinder Lock |

Figure 3:
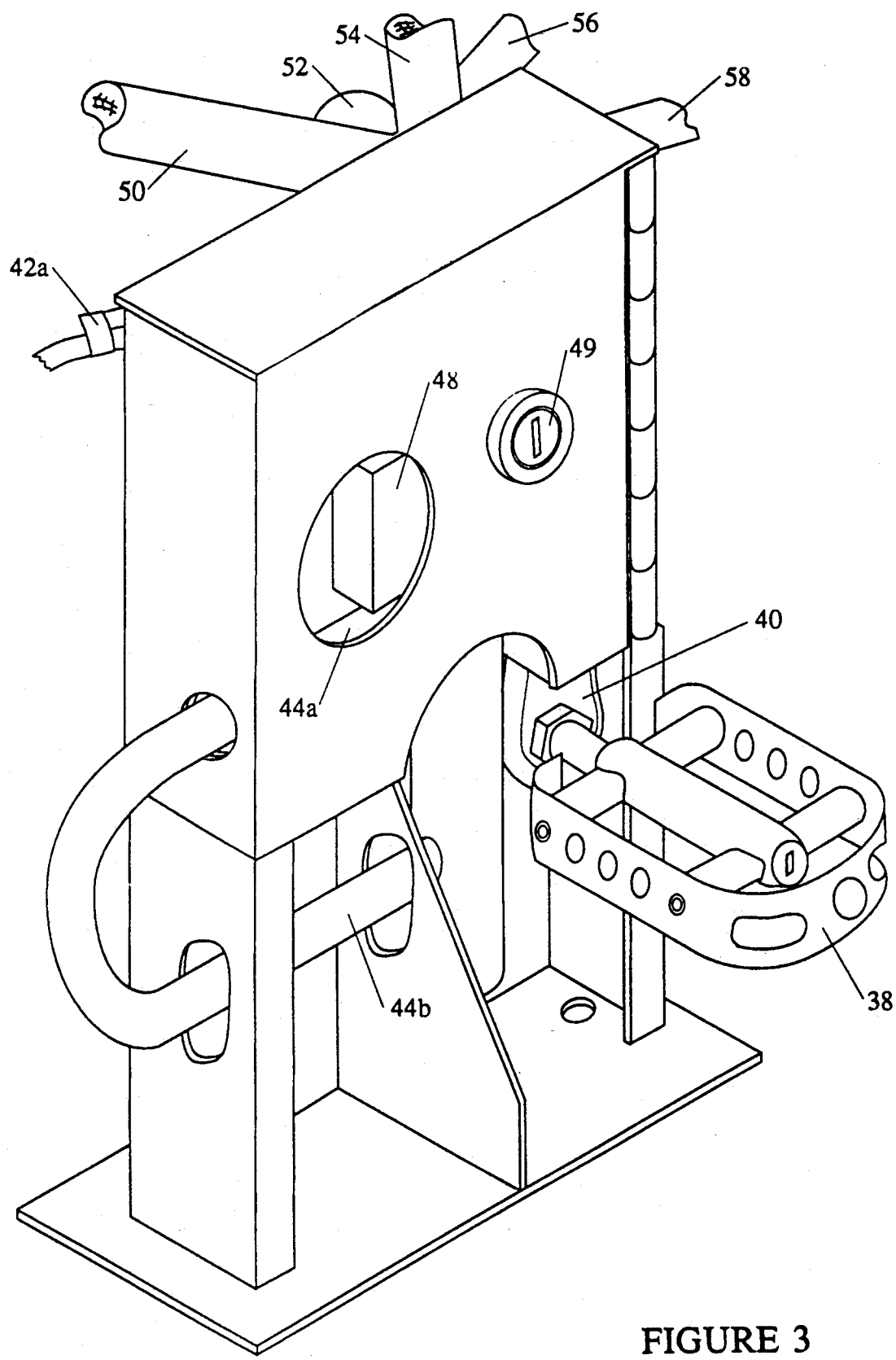
FIG. 3 shows the bicycle parking rack in its closed and locked position. All three locks installed securing the bicycle by capturing its left crankarm.

(Introduced in FIG. 3)

| | |
|---|---|
| 50 | Bicycle Downtube |
| 52 | Bicycle Bottom Bracket Shell |
| 54 | Bicycle Seat Tube |
| 56 | Bicycle Right Chain Stay |
| 58 | Bicycle Left Chain Stay |

*has a pair of holes - inboard and outboard for pad and cylinder locks
**actual bicycle axle does not appear in any of the figures

DESCRIPTION OF INVENTION

FIG. 1 shows an axonometric drawing of a basic version of our bicycle parking rack. Its break-formed and welded structure is of flame-cutting resistant, 4 mm, 10 gauge, marine grade stainless-steel. It begins with a Baseplate 10 measuring 20.3 cm by 10.1 cm. The baseplate can be either welded or affixed by stainless-steal fasteners, to a horizontal/vertical surface of a new or existing structure. When fasteners are used they are passed through four strategically placed holes—Mounting Hole Left 11a, Mounting Hole Right 11b, Mounting Hole Aft 11c and Mounting Hole Front 11d. Welded to the baseplate perpendicularly is a Chamber 12 which compromises the mass of the rack. The dimensions of the chamber are 5.1 cm by 18 cm by 33.6 cm. Chamber 12 is break-formed in 4 places to create a 3-sided C-section channel with two flanges on its open face. The chamber is also welded to the baseplate with a triangular metal gussey identified as an Anti-Drill Baffle 14. Above anti-drill baffle is a Door 16 that is joined to the chamber by a Door Hinge 18. The door is break-formed along its left and top lengths to provide flanges which fit around the width of the chamber. The top surface to the door extends beyond the top back edge of the chamber by 1 cm leaving a Top Door Flange 16a.

The rack has a total of 13 voids or holes. Five of these are found in the door. Along the bottom edge of the door is a 6.3 cm semi-circle cutout or Key Access Cutout 20. Moving up from the cutout exists a Cylinder Lock Hole 22 with a diameter of 2.4 cm. The cylinder lock hole is girdled by a 0.5 cm thick washer or Cylinder Lock Reinforced Ring 24 which is welded to the door face. To the left of the ring is a Padlock Rotation/Insertion Access Hole 26 with a 6.3 cm diameter. Moving yet further left around to the left-side surface of the door is a U-Lock Upper Door Hole 28a of 2.2 cm diameter. This hole aligns with a matching U-Lock Upper Chamber Hole 28b. Moving down 9 cm, located on the same surface, is found an elongated 2.3 cm diameter U-Lock Lower Chamber Hole 30a. From there, moving horizontally through the lower inside of the chamber to the anti-drill baffle is an aligning U-Lock Lower Anti-Drill Baffle Hole 30b. This concludes all parts shown in FIG. 1

FIG. 2 shows the rack in the same position with the door open 180 degrees. The closed-door position is outlined with phantom lines to show where the padlock and cylinder lock go. The scale is reduced to allow depiction of all locks and entry paths of all three and a bicycle's left crankarm. This view also reveals interior parts and additional voids/holes.

In the upper left corner of the chamber's back wall are two cutout—a Left Cable End Slot 31a and a Right Cable End Slot 31b. The metal portion between these two cutouts creates an extension or Cable End Hitch 32, 1.6 cm wide by 3.1 cm long. To the right of the right cable end slot is a Finger Access Hole 33 with diameter of 2.3 cm. Immediately below the finger access hole, welded perpendicularly to the back of the chamber and to a Crankarm Positioning Vertical Baffle 35, is an ipper Hasp Plate 34a which has two 1 cm diameter holes in it—an inboard and an outboard hole. A corresponding identical Lower Hasp Plate 34b is welded to the door's interior surface. Right-adjacent to the upper hasp plate is the crankarm positioning vertical baffle measuring 18 cm by 4.4 cm. On the other side of the crankarm positioning baffle is welded a Crankarm Positioning Horizontal Baffle 36. This baffle is additionally welded to the back and right side of the inner walls. Directly above the crankarm positioning horizontal baffle is an Axle Clearance Slot 37 measuring 3.5 cm wide by 8.5 cm depth. This completes the parts and voids of the rack itself. All remaining parts to be cited in FIG. 2 and 3, such as locks and bicycle parts, are external to the bicycle parking rack.

Continuing with FIG. 2, above the axle clearance slot is a bicycle pedal 38 connected to a Bicycle Left Crank 40. A projection line shows the area and direction where the bicycle crankarm inserts into the chamber.

To the left of the crankarm and pedal is a Left Cable End Slot 42a and a Right Cable End Slot 42b. Following the projection line, cable ends slip into the slots. Situated separateky on the left side of the rack is an Upper U-Lock Shackle Leg 44a and a Lower U-Lock Shackle Leg 44b positioned to be inserted into the chamber in the direction of the projection lines. The shackle legs of a U-lock are between 9.2 and 13.5 cm apart and are inserted into a U-Lock Receptacle Barrel Additional locks that can serve are a combination or Padlock 48 and a Cylinder Lock 49. That concludes all parts shown in FIG. 2.

FIG. 3 shows the final state with the crankarm entered, the door and all locks shut. The only parts introduced in this figure are of the bicycle frame. From left to right there is a Bicycle Downtube 50, a Bicycle Bottom Bracket Shell 52 (which contains the bicycle's crank axle and bearings, not shown), a Bicycle Seat Tube 54, a Bicycle Right Chain Stay 56, and Bicycle Left Chain Stay 58. The remaining parts cited are the exploded items in FIG. 2 in their locked positions.

OPERATION —FIGS.1, 2, 3

Proper installation is necessary for this to be a fully secured bicycle parking rack. As mentioned, the baseplate can be welded to a butting surface, or stainless steel bolt fasteners can be applied instead. If fasteners are chosen, they are cinched down through the mounting holes located in the baseplate. The fastener heads are then welded to the baseplate and inner walls of the chamber which provide additional shielding from destruction to the fastener heads.

Once installed, the door is opened to the position shown in FIG. 2. The bicycle left crankarm is then inserted down into the chamber to the right of the vertical crankarm positioning baffle. (Follow the projection line). The purpose for the horizontal crankarm positioning baffle is to keep the bottom bracket shell as close as possible to the back of the chamber to preclude sawing off of the crank axle (not shown). With the door still open a standard bicycle cable is ran through the front and rear wheels. The right cable end is slipped over the cable end hitch. Then the same is done with the left cable end. With the door still open the cylinder lock is installed into the cylinder hole and outboard hole of the lower hasp plate.

The door is then closed and the cylinder lock is engaged by turning the key forcing its shaft to pass up through the outboard hole of the upper hasp plate. The shut door encloses the left crankarm and the cable ends. Next, the padlock in the open position is passed through the padlock rotation/insertion access hole, hooked though the inboard holes of the upper and lower hasp plates, rotated to the lock-aligned position and shut.

After the cylinder and padlock comes the U-lock installation. Following the projection lines, the U-lock shackle legs are inserted through the 4 U-lock holes—upper door, upper chamber, lower chamber, and lower baffle—in the following sequence. The upper shackle leg end is inserted into the U-lock receptacle barrel immediately after passing through the upper holes in the door and chamber. Then the entire U-lock is moved rightward until the barrel contacts the crankarm positioning vertical baffle and the lower shackle leg enters the barrel. The U-Lock key is turned to the locked position and removed from the bottom of the barrel.

SUMMARY, RAMIFICATIONS, AND SCOPE

This bicycle parking rack is very easy to use, extremely efficient for its size, and not outmoded by changing bicycle designs. It does not damage painted parts. Chamber dimensions have been sized to give the greatest protection to the locks while at the same time allowing ease-of-use and a great variety of lock types, makes, and models. Attention has been given to assure the axle clearance slot and crankarm baffles will accommodate the vast majority of bicycles. Nothing is overlooked. Even the installation options have been well thought out by protecting and welding the fasteners.

Again, one of the main features that sets this rack apart is its ability to accept multiple locks within the protective plating of the chamber. The lock placements are arranged so that each lock additionally shields, and restricts movement of the other. The incorporation of the cylinder lock is not only unique but allows for convenient reserved/restricted parking management. Furthermore, a version of our rack with only a coin operated cylinder lock will solve the problem of people self-reserving a rack by leaving their lock without bicycle on the rack. Finally, special consideration has been given to the latest criminal tactic of pouring liquid nitrogen into the receptacle barrel of U-Locks. The U-Lock once installed in the chamber has its lock access facing down. It cannot be moved into a position to pour the liquid into it.

We claim:

1. A lockable bicycle rack formed to act in concert with an independent lock assembly for releasably securing a bicycle thereto, said lock assembly including a securing bolt member, said bicycle rack comprising:

a base member defining a receiving slot formed and dimensioned for receipt of a portion of the bicycle in said receiving slot, said base member further including a bolt port extending through a portion thereof and formed to slidably receive the securing bolt member of said lock assembly therethrough, and a cover door assembly formed and dimensioned to cooperate with said base member and including an aligning port extending through a portion thereof, said cover door assembly being movable between a selected one of:

(i) a non-engaging condition where said cover door assembly is positioned for installation and removal of said portion of said bicycle into an out of said receiving slot, and (ii) an engaging condition where said cover door assembly cooperates with said base member in a manner blocking said receiving slot to prevent removal of said bicycle portion therefrom and said aligning port is aligned with said bolt port of said base member for sliding receipt of said securing bolt member therethrough to prevent said cover door assembly from moving to said non-engaging condition when said securing bolt of said lock assembly releasably locks said cover door assembly to said base member;

said base member and said cover door assembly, when said cover door assembly is in said engaging condition, cooperating to surround and shield said lock assembly sufficiently to substantially reduce access to areas of said lock assembly enabling unauthorized unlocking of said assembly.

2. The lockable bicycle rack as defined in claim 1 wherein,
said base member includes a retaining wall and two spaced-apart side flanges extending outwardly therefrom toward said cover assembly, when in said engaging position, and defining a chamber therebetween formed for receipt of said bicycle portion and a substantial portion of said lock assembly therein.

3. The lockable bicycle rack as defined in claim 2 wherein,
said cover door assembly includes a shielding wall positioned opposite said retaining wall when in said engaging condition, and
one of said base member and said cover assembly having an access aperture providing said reduced access to areas of said lock assembly to enable autorized unlocking of said lock assembly.

4. The lockable bicycle rack as defined in claim 3 wherein,
said receiving slot includes an entrance to said slot proximate a top portion of said base retaining wall for initial receipt of said bicycle portion, and
said cover door assembly further including a cover flange extending outward from said shielding wall toward said retaining wall and positioned to block said slot entrance when said cover assembly is moved to said engaging condition.

5. The lockable bicycle rack as defined in claim 4 wherein,
said top portion of said base retaining wall terminating at a position above a crank axle of said bicycle, said receiving slot extending downwardly from said top portion and formed for sliding receipt said crank axle therein, and
said base member further including a baffle member positioned between said spaced-apart side flanges and extending proximate said receiving slot, said baffle member, retaining wall and one of said flanges cooperating with said cover door assembly, when in said engaging condition, to define a channel formed and dimensioned to receive a crank arm of said bicycle therein.

6. The lockable bicycle rack as defined in claim 5 wherein,
said baffle member is oriented substantially vertically and extends outward from said retaining wall into said chamber.

7. The lockable bicycle rack as defined in claim 6 wherein,
a substantial portion of a pedal of said bicycle, extending outward from said crank arm, projects beyond a bottom edge of said cover door assembly when in said engaging condition.

8. The lockable bicycle rack as defined in claim 3 wherein,
said base member includes a first hasp plate defining said bolt port and extending outward from said retaining wall toward said shielding wall, and
said cover door assembly includes a second hasp plate defining said aligning port and extending outward from said shielding wall toward said retaining wall, said first and second hasp plates cooperating to prevent said cover door assembly from moving to said non-engaging condition when said securing bolt of said lock assembly extends through both said bolt port and said aligning port.

9. The lockable bicycle rack as defined in claim 8 wherein,
said first hasp plate is oriented substantially horizontally and positioned between a second of said spaced-apart side flanges.

10. The lockable bicycle rack as defined in claim 9 wherein,
said lock assembly is provided by a pad lock dimensioned to fit through said access aperture and into said chamber.

11. The lockable bicycle rack as defined in claim 3 wherein,
said cover assembly further includes a cover flange defining said aligning port and extending outwardly from said shielding wall toward said retaining wall, said cover flange cooperating with one of said spaced-apart side flanges to prevent said cover door assembly from moving to said non-engaging condition when said securing bolt of said lock assembly extends through both said aligning port and the bolt port of said one side flange.

12. The lockable bicycle rack as defined in claim 9 wherein,
said lock assembly is provided by a U-lock including a substantially U-shaped securing bolt and a lock housing containing a lock mechanism for releasably securing the distal ends of said U-shaped securing bolt thereto, one of said distal ends of said securing bolt extending through said aligning port and said bolt port into said chamber, and oriented to position said lock housing substantially in said lock housing.

13. The lockable bicycle rack as defined in claim 12 wherein,
said base member further includes a central gusset plate defining a first bolt aperture and positioned between said spaced-apart side flanges and extending outward from said retaining wall into said chamber, and
said one side flange further defining a second bolt aperture in substantial horizontal alignment with said first bolt aperture, said first and said second bolt apertures formed to receive the second distal end of said U-shaped securing bolt for releasable mounting of said lock assembly to said rack.

14. The lockable bicycle rack as defined in claim 13 wherein,
said access aperture is positioned proximate a bottom edge of said shielding wall.

15. The lockable bicycle rack as defined in claim 9 further including:
an elongated cable having one end securely mounted to said base member and an opposite end releasably mounted to said base member.

16. The lockable bicycle rack as defined in claim 15 wherein,
said retaining wall defining a cable slot formed to releasably secure the opposite end of said cable thereto, said cover assembly and said base member cooperating to block said cable slot to prevent removal of said opposite end therefrom when said cover assembly is moved to said engaging position.

17. The lockable bicycle rack as defined in claim 1 wherein,
said door assembly is pivotally mounted to said base member for movement between said non-engaging condition and said engaging condition.

18. The lockable bicycle rack as defined in claim 1 wherein, said bicycle rack is stainless steel.

19. A lockable bicycle rack formed to act in concert with one of an independent U-lock assembly and an independent pad lock assembly, each lock assembly including a securing bolt member, for releasably securing a bicycle thereto, said bicycle rack comprising:

(a) a base member including
  (1) a retaining wall defining a receiving slot formed and dimensioned for receipt of a portion of the bicycle therein,
  (2) two spaced-apart side flanges extending outwardly therefrom defining a chamber therebetween, one of said side flanges defining a flange bolt port extending therethrough and formed to slidably receive the securing bolt member of said U-lock assembly, and
  (3) a first hasp plate positioned between said side flanges and extending outward from said retaining wall into said chamber, said first hasp plate defining a hasp bolt port extending therethrough and formed to slidably receive the securing bolt member of said pad lock assembly therein;

(b) a cover door assembly formed and dimensioned to cooperate with said base member and including
  (1) a shielding wall defining a flange aligning port extending therethrough, and
  (2) a second hasp plate extending outward from said shielding wall and defining a hasp aligning port extending through a portion thereof, said cover door assembly being movable between a selected one of:
    (i) a non-engaging condition where said cover door assembly is positioned for installation and removal of said portion of said bicycle into an out of said receiving slot, and
    (ii) an engaging condition where said cover door assembly cooperates with said base member in a manner blocking said receiving slot to prevent removal of said bicycle portion therefrom, said hasp aligning port is aligned with hasp bolt port and said flange aligning port is aligned with flange bolt port for sliding receipt of a respective one of said securing bolt member of said pad lock assembly and said securing bolt member of said U-lock assembly therethrough to prevent said cover door assembly from moving to said non-engaging condition when said respective securing bolt of said one of the pad lock assembly and the U-lock assembly releasably locks said cover door assembly to said base member;

said base member and said cover door assembly, when said cover door assembly is in said engaging condition, cooperating to surround and shield one of said pad lock assembly and said U-lock assembly sufficiently to substantially reduce access to areas of the respective lock assemblies enables unauthorized unlocking thereof.

20. The lockable bicycle rack as defined in claim 19 wherein, said receiving slot includes an entrance to said slot proximate a top portion of said base retaining wall for initial receipt of said bicycle portion, and said cover door assembly further including a cover flange extending outward from said shielding wall toward said retaining wall and positioned to block said slot entrance when said cover assembly is moved to said engaging condition.

21. The lockable bicycle rack as defined in claim 20 wherein, said top portion of said base retaining wall terminating at a position above a crank axle of said bicycle, said receiving slot extending downwardly from said top portion and formed for sliding receipt said crank axle therein, and said base member further including a baffle member positioned between said spaced-apart side flanges and extending proximate said receiving slot, said baffle member, retaining wall and one of said side flanges cooperating with said cover door assembly, when in said engaging condition, to define a channel formed and dimensioned to receive a crank arm of said bicycle therein.

22. The lockable bicycle rack as defined in claim 21 wherein, said baffle member is oriented substantially vertically and extends outward from said retaining wall into said chamber.

23. The lockable bicycle rack as defined in claim 22 wherein, a substantial portion of a pedal of said bicycle, extending outward from said crank arm, projects beyond a bottom edge of said cover door assembly when in said engaging condition.

* * * * *